United States Patent [19]

Stadlmeier et al.

[11] Patent Number: 4,607,366
[45] Date of Patent: Aug. 19, 1986

[54] APPARATUS FOR TESTING A HIGHLY-INTEGRATED, MICROPROGRAM-CONTROLLED ELECTRONIC COMPONENT

[75] Inventors: Hans Stadlmeier; Franz Schönberger, both of Munich, Fed. Rep. of Germany

[73] Assignee: Siemens Aktiengesellschaft, Berlin and Munich, Fed. Rep. of Germany

[21] Appl. No.: 549,577

[22] Filed: Nov. 7, 1983

[30] Foreign Application Priority Data

Nov. 9, 1982 [DE] Fed. Rep. of Germany ....... 3241412

[51] Int. Cl.[4] ...................... G06F 11/00; G01R 31/28
[52] U.S. Cl. ...................................... 371/16; 364/200
[58] Field of Search .................... 371/16, 20; 364/200, 364/900

[56] References Cited

U.S. PATENT DOCUMENTS

| | | | |
|---|---|---|---|
| 4,327,408 | 4/1982 | Frissell et al. | 364/200 |
| 4,433,412 | 2/1984 | Best et al. | 371/16 X |
| 4,500,993 | 2/1985 | Jacobson | 371/16 |

Primary Examiner—Charles E. Atkinson
Attorney, Agent, or Firm—Herbert L. Lerner; Laurence A. Greenberg

[57] ABSTRACT

An apparatus for testing a highly-integrated microprogram-controlled electronic component in combination with the component, includes a sequencer disposed in the component for forming microprogram sequence links, and a test register disposed in the component having outputs connected to the sequencer for controlling a test, the test register having an input being connectible to a central processing unit and to an external testing device.

11 Claims, 1 Drawing Figure

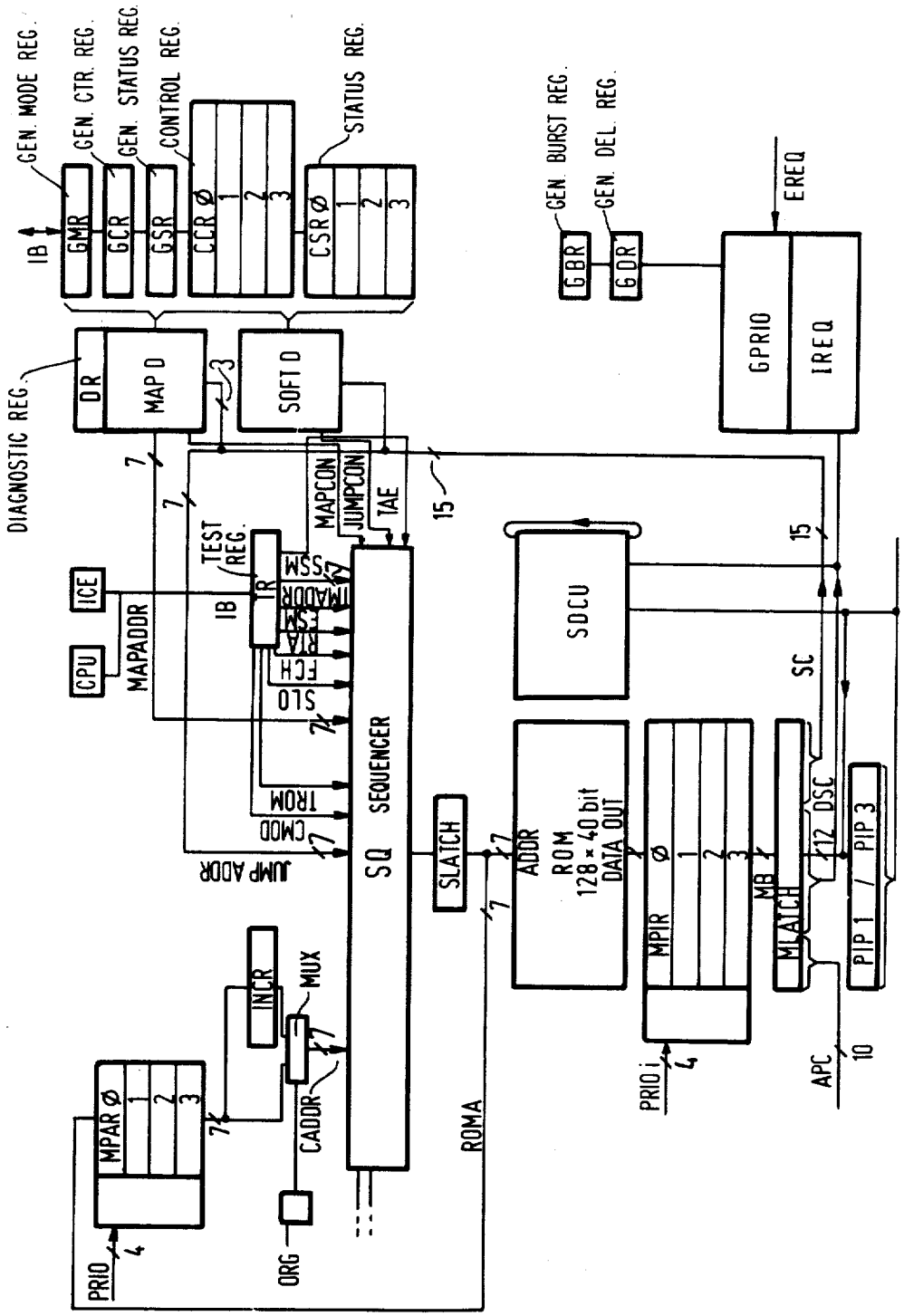

APPARATUS FOR TESTING A HIGHLY-INTEGRATED, MICROPROGRAM-CONTROLLED ELECTRONIC COMPONENT The invention relates to an apparatus for testing a highly-integrated microprogram-controlled electronic component with a sequencer for forming microprogram sequence links.

The more complex a given device becomes, the more urgent becomes the problem of testability, i.e., first of all, in other words as to whether or not this device fulfills its purpose. This relates particularly to integrated circuits, in which the testing problem is closely connected with the question of economic feasibility due to the multiplicity of switching elements and the possible state combinations and therefore error combinations, the impossibility of performing an error correction on an individual device, and finally the large production quantities.

It is accordingly an object of the invention to provide an apparatus for testing a highly-integrated, microprogram-controlled, electronic component, which overcomes the hereinafore-mentioned disadvantages of the heretofore-known devices of this general type, with which it is possible to check the microprogram control functionally or to control other parameters.

With the foregoing and other objects in view there is provided, in accordance with the invention, an apparatus, combined with the component for testing a highly-integrated microprogram-controlled electronic component, comprising a sequencer disposed in the component for forming microprogram sequence links, and a test register disposed in the component having outputs connected to the sequencer for controlling a test, the test register having an input being connectible to a central processing unit or to an external testing device.

In accordance with another feature of the invention, the test register includes means for applying a test address in the test register to the sequencer.

In accordance with a further feature of the invention, the test register includes means for individually executing a microcommand.

In accordance with an added feature of the invention, the test register includes means for stopping a functional unit if an internal error event occurs.

In accordance with an additional feature of the invention, the test register includes means for cyclically executing a given microcommand.

In accordance with another feature of the invention, there is provided a microcommand memory, an external bus, and means being part of the test register for reading out microcommands from the microcommand memory and for transferring the microcommands to the external bus.

In accordance with a further feature of the invention, the component includes pins, the sequencer generates a microcommand sequence link, and the test register includes means for transmitting the microcommand sequence link to at least part of the pins.

In accordance with an added feature of the invention, the test register includes means for switching off activity of the component for given functional units.

In accordance with an additional feature of the invention, the test register includes means for accessing a register being otherwise secured against writing in.

In accordance with a concomitant feature of the invention, there are provided means connected to the sequencer for indicating a code error.

The invention makes it possible, in an extremely simple and rapid manner, to have access to given functional units of an electronic component, to bring these functional units to given states, to observe the state changes easily, to bring about as many relevant state changes in as short a time as possible (which is particularly important for production tests), and to provide testing possibilities not only for production, but also for employment in a system as an "In-Circuit Emulator", abbreviated to "ICE".

Three particular advantages of the invention should therefore be emphasized:
The simple setting of the testing mode, the large number of testing possibilities, and the rapid statement regarding operability.

Other features which are considered as characteristic for the invention are set forth in the appended claims.

Although the invention is illustrated and described herein as embodied in an apparatus for testing a highly-integrated, microprogram-controlled electronic component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a schematic circuit diagram of the apparatus according to the invention.

Referring now to the FIGURE of the drawing in detail, there is seen an integrated heavy-duty DMA controller ADMA (advanced direct memory access) which, for instance, has four mutually independent channels for transferring data between media (peripheral equipment, memories) or, more generally, between a data source and a data sink. The main control of the channels is taken over by microprograms, having a command sequence which is controlled by a sequencer SQ.

A test register TR is provided in the ADMA. As with any other ADMA register, the test register can also be loaded by a central processing unit (CPU) and a testing device, respectively, for servicing. This test register TR can be utilized for production tests as well as for system use (such as an ICE) and performs the following functions:

A bit TAE ("test address enable") permits a microcommand test address TMADDR which is also stored in the test register TR to be applied to the sequencer SQ. It is therefore possible to select and eventually execute any desired microcommands MB or microprogram entries.

A bit SSM ("single step mode") takes care of the individual execution of a microcommand MB, i.e., after each microcommand MB the ADMA stops. The internal status of the ADMA can then be checked by the central processing unit (CPU) or by a testing device, by reading the internal registers.

A bit ESM ("error stop mode") is provided. If an internal error occurs in a channel, the bit ESM makes it possible to either stop only that channel or to stop all of the channels.

A bit CMOD ("cyclic mode") enables a certain microcommand MB to be executed cyclically. The microcommand may happen to be present or may have been previously selected by means of the bit TAE or the address TMADDR. This possibility is of particular interest for observation by means of a "logic-state analyzer"/oscilloscope or a scanning electron microscope, in order to obtain a stationary picture. Through the use of a cyclically executed microcommand MB, voltage-carrying elements of the electronic component to be tested can be visualized stroboscopically.

Two bits TROM 0,1 (Test ROM) permit parts of the content (microcommands) of the microcommand memory to be read out and transmitted to an external bus.

A bit SLO ("SLATCH OUT") enables the output of a microcommand sequence link or microaddress ROMA generated by the sequencer SQ to be fed to certain pins of the electronic component which are otherwise used in normal operation. It is thereby possible to externally control the sequencer function and therefore also the formation of microcommand sequence links when working up microcommands.

A bit FCH ("fixed channel number") permits the limitation of the ADMA activity to a single channel which is defined by two further bits CH ("channel number").

A bit RTA ("register test access") provides access for test purposes to registers which are otherwise prevented from writing.

According to the invention, test functions are therefore provided for the first time in a highly integrated component, without special additional expense, such as has only been provided in large computers in the past.

The internal registers of the ADMA are loaded and read-out through an internal bus IB. Internal registers which are available in the ADMA substantially include a general mode register GMR, a general control register GCR, four control registers CCR specific to channels, a general status register GSR, four status registers CSR specific to channels, a general "burst" register GBR, a general delay GDR register and the above-mentioned test register TR.

Four different kinds of microcommand addresses can be applied to the sequencer SQ: A "continue" address CADDR, a jump address JUMPADDR, a map address MAPADDR and the test address TMADDR.

If the bit TAE is set, the connected test address TMADDR with the highest priority is selected. If a signal MAPCON is activated and the bit TAE is not set, then the map address MAPADDR applied with the highest priority is selected. If the signal MAPCON is not activated and the bit TAE is also not set, but if on the other hand, a signal JUMPCON is activated, the jump address JUMPADDR present with the highest priority is selected. If the signal MAPCON as well as the signal JUMPCON are not activated and if the bit TAE is not set, the "continue" address CADDR applied is selected. The current microaddress ROMA selected by the sequencer SQ is stored in the interim in an interim memory SLATCH. This current microcommand address ROMA reads out the corresponding microcommand MB from a microcommand memory ROM. This corresponding microcommand MB is stored in a microinstruction register MPIRi, where i=0,1, 2,3 selected by a prioritizing unit GPRIO and is then stored in the interim memory MLATCH. The prioritizing unit GPRIO selects one of the four channels of the ADMA on the basis of external requests EREQ, on the basis of internal requests IREQ and on the basis of information which is contained in internal registers. The prioritizing unit GPRIO addresses the channel selected over a line PRIOi.

The current microcommand address ROMA is stored in a microprogram address register MPARi specific to a selected channel, where i=0,1,2,3. The current microcommand address is incremented in an incrementer INCR. If the current microcommand address ROMA belongs to a so-called organization microcommand, the incremented current microcommand address ROMA is selected by a bit ORG set for an organizational microcommand by means of a multiplexer MUX for the following "continue" address CADDR. If the current microcommand address ROMA belongs to a DMA transfer microcommand, the unchanged current microcommand address ROMA is selected by means of the multiplexer MUX.

The microcommand MB contained in the interim memory MLATCH contains a field SC for the sequencer control. This field SC furnishes test conditions which are checked in a soft decoder SOFTD and in a map decoder MAPD for their current validity by means of the internal registers. If the test conditions contained in the field SC are valid, the respective signals MAPCON and JUMPCON are activated. The microcommand MB furthermore contains a field DSC for data control in cooperation with a data control unit SDCU. The microcommand MB also contains a field APC for controlling address pointers. The microcommands of different channels are treated sequentially in a pipeline device PIP1/PIP3.

The test address TMADDR and the bit TAE form an important feature for the start-up test of the electronic component, as well as for the following series tests: they ensure the observability of the behavior of the electronic component according to a microinstruction sequence set-in from the outside. In this way, planned entries in test microprogram routines can be provided in a simple manner. These test microprograms cannot be entered from channel programs. These test microprograms are placed in unoccupied storage locations of the internal microcommand memory ROM.

The bit SSM and the bit CMOD can likewise be a valuable aid for start-up tests of the electronic component as well as for diagnostic purposes together with the feature "unconditional transfer of a test microaddress" (TMADDR together with TAE). For instance, microinstructions within the microcommand memory ROM which cause the active output of status information to occur, can be entered selectively.

A microcommand is advantageously given piecemeal to the external bus by means of the two bits TROM 0,1 after the microcommand is subdivided into several parts and preferably for testing purposes. The two bits TROM 0,1 provide four possible combinations of these two bits, namely, one possible combination for O-coding and three possible combinations for reading out three parts of a microcommand divided into three parts.

The FIGURE includes a diagnostic register DR. This diagnostic register DR serves as a "trace feature" for controlling the cycle and for fault diagnosis. This diagnostic register DR is a timed register. In operation of the electronic component, in the case of a fault condition, the diagnostic register DR is loaded with a code word (or sequence of code words) which corresponds to the type of fault condition encountered. The user circuit using or driving the electronic component can read the diagnostic register over the internal bus IB. The clock or timer is suppressed for the duration of each stop-microcommand. The diagnostic register DR contains the address of the microcommand that was just run. In the event of an error, this microcommand that was just run is the cause of the error. The diagnostic register DR furthermore contains the sequence link, i.e., the address of the microcommand following the completed microcommand or the error code if an error has occurred.

The diagnostic register also contains a field with two bits for a priority signal PRIO. In the event of an error, this priority signal PRIO unambiguously defines that channel in which the error has occured.

If an error occurs in a channel, either the faulty channel alone or all of the channels are stopped simultaneously, depending on the error stop mode. Since only a single diagnostic register DR is provided in common for all of the channels, the content of the diagnostic register DR would be overwritten if all channels are not stopped simultaneously, but another channel continues to be active, upon the occurence of an error in one channel. This must be taken into consideration when the microprogram is written.

Upon the occurence of an error in one channel, the presently prevailing priority PRIO is held for a microcommand by blocking the interim memory for the field of two bits for the priority PRIO within the diagnostic register DR. This ensures that after a faulty microcommand which concerns a given channel, a stop microcommand entered thereupon will run in the same channel. Therefore, the address of the just completed microcommand, the sequence link of the following microcommand or the code error and the indication of the faulty channel, can be taken from the diagnostic register DR.

We claim:

1. Apparatus for testing a highly-integrated microprogram-controlled electronic component in combination with the component, comprising a sequencer disposed in the component for forming micro-program sequence links, and a test register having a plurality of storage locations; a central processing unit connected to the component and an in-circuit emulator (ICE) external to the component, both being capable of addressingly engaging the test register; the ICE, in case of a fault condition, operatively engaging the test register for executing test-control microcommands by the test register; the test register disposed in the component and having a plurality of output channels connected to said sequencer for controlling the test.

2. Apparatus according to claim 1 comprising a first storage location for storing a test address enable microcommand for selectively applying a corresponding test address on the sequencer.

3. Apparatus according to claim 2, comprising a second storage location for storing a single step mode microcommand for activating a micro-command one step at a time.

4. Apparatus according to claim 3, comprising a third storage location for storing an error stop mode microcommand for stopping at least one of said output channels.

5. Apparatus according to claim 4, comprising a fourth storage location for storing a cyclic mode microcommand for the cyclically repeated execution of a given microcommand.

6. Apparatus according to claim 5, comprising two fifth storage locations for reading out at least part of the contents of a microcommand memory and transmitting said part to a given external bus.

7. Apparatus according to claim 6, comprising a sixth storage location for storing a "slatch-out" micro-command for enabling at least one of a microcommand sequence link or micro address generated by the sequencer to be connected to selected pins of the component.

8. Apparatus according to claim 7, comprising a seventh storage location for storing a "fixed channel number" microcommand for limiting the component to operate a single channel only.

9. Apparatus according to claim 8, comprising an eighth storage location for storing a register test access microcommand for providing test access to registers having write protection.

10. Apparatus according to claim 2, comprising a diagnostic register for storing the code of a just executed microcommand, for saving said code in case of a fault condition.

11. Apparatus according to claim 10, comprising means for reading said diagnostic register and an internal bus included in said component for reading said diagnostic register.

* * * * *